United States Patent [19]

College et al.

[11] Patent Number: 5,270,026

[45] Date of Patent: Dec. 14, 1993

[54] SULFUR DIOXIDE SCRUBBING PROCESS PRODUCING PURIFIED MAGNESIUM HYDROXIDE

[75] Inventors: John W. College, Pittsburgh, Pa.; Lewis B. Benson, Louisville, Ky.

[73] Assignee: Dravo Lime Company, Pittsburgh, Pa.

[21] Appl. No.: 989,000

[22] Filed: Dec. 11, 1992

[51] Int. Cl.⁵ .................. C01B 17/00; C01B 17/20; C01F 1/00
[52] U.S. Cl. ..................... 423/243.08; 423/164; 423/243.09
[58] Field of Search ............ 423/243.01, 243.08, 423/143.09, 164

[56] References Cited

U.S. PATENT DOCUMENTS

| | | | |
|---|---|---|---|
| 3,919,393 | 11/1975 | Selmeczi | 423/242 |
| 3,919,394 | 11/1975 | Selmeczi | 423/242 |
| 4,294,807 | 10/1981 | Randolph | 423/242 |
| 4,627,970 | 12/1986 | Krüger | 423/555 |
| 4,804,523 | 2/1989 | Abrams et al. | 423/243.08 |
| 4,976,936 | 12/1990 | Rathi et al. | 423/242 |
| 4,996,032 | 2/1991 | Stowe, Jr. et al. | 423/242 |
| 5,039,499 | 8/1991 | Stowe, Jr. | 423/242 |
| 5,082,639 | 1/1992 | Lee et al. | 423/242 |

*Primary Examiner*—Gregory A. Heller
*Attorney, Agent, or Firm*—Armstrong, Westerman, Hattori McLeland & Naughton

[57] ABSTRACT

A process for removing sulfur dioxide from flue gases where calcium sulfate and magnesium hydroxide are produced, with the magnesium hydroxide separated in an impure state and purified by addition of water thereto to dissolve contaminant calcium sulfate. The calcium sulfate preferentially dissolves to form an aqueous solution and purified magnesium hydroxide is separated therefrom. At least a portion of the resultant aqueous solution of calcium sulfate is returned to the wet scrubbing system as make-up water to replenish water lost from the aqueous medium during scrubbing of the flue gases.

9 Claims, 1 Drawing Sheet

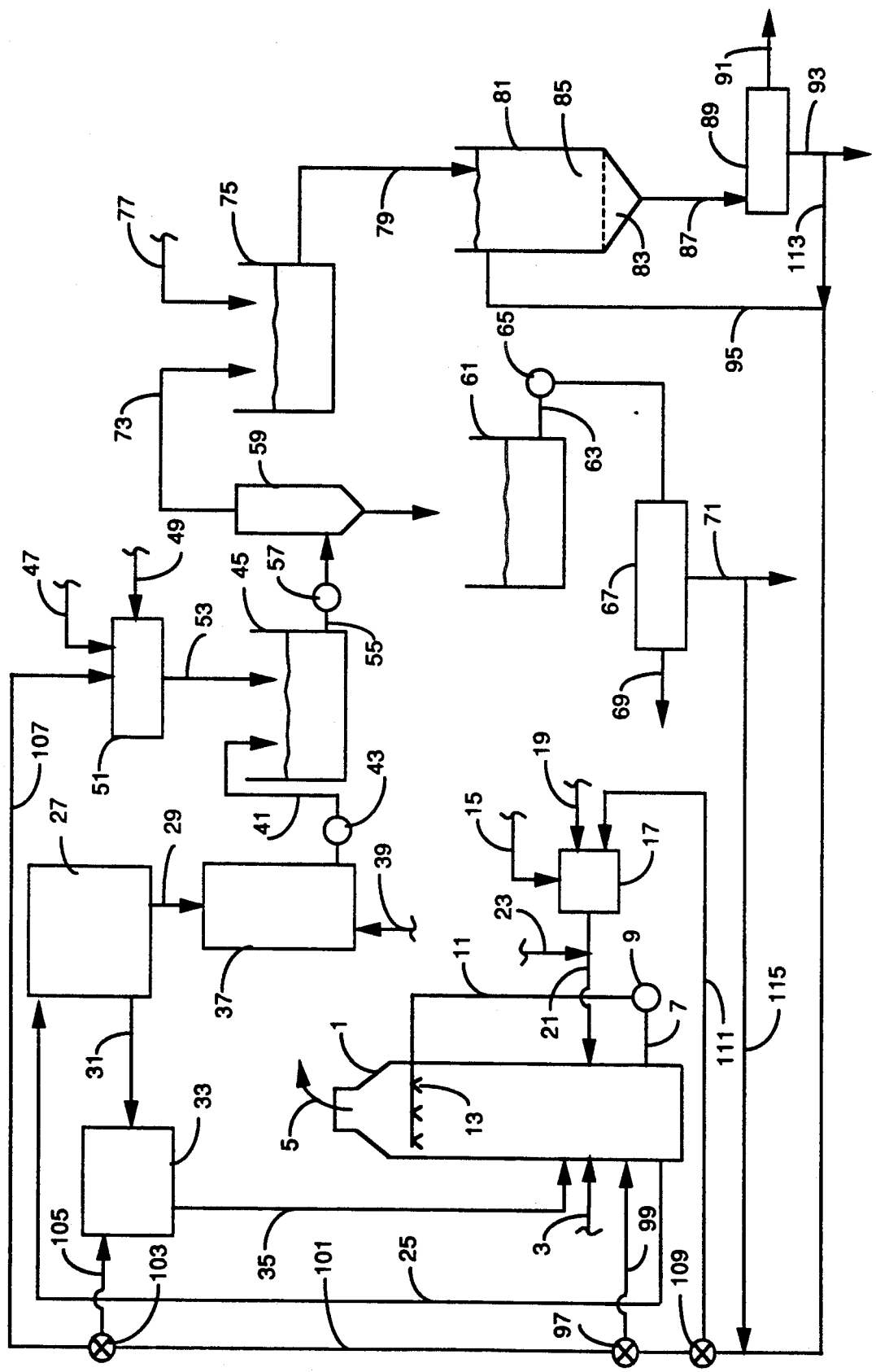

SULFUR DIOXIDE SCRUBBING PROCESS PRODUCING PURIFIED MAGNESIUM HYDROXIDE

FIELD OF THE INVENTION

The present invention relates to a process for removing sulfur dioxide from a gaseous stream using magnesium components, wherein a purified magnesium hydroxide product is produced from the scrubbing effluent.

BACKGROUND OF THE INVENTION

The need to remove sulfur dioxide from gaseous streams, such as flue gases from power plants using fossil fuels, in order to protect the environment has become increasingly important with the enactment of legislation limiting the amount of sulfur dioxide that can be discharged from facilities. In order to meet this need, various sulfur dioxide removal processes have been developed, including dry removal systems and wet scrubbing systems. In wet scrubbing systems, aqueous slurries of reactant products result which are normally dewatered and the dewatered slurry disposed of as a landfill material.

In order to recover various components of an aqueous sludge from a sulfur dioxide wet scrubbing system, attempts have been made to convert the sludge components to saleable byproducts. In systems where lime or limestone are used and calcium sulfites and/or sulfates are present in the sludge, for example, processes have been developed to produce gypsum in a form that would be saleable for use in wallboard or other products using gypsum.

Certain improved sulfur dioxide wet scrubbing systems are based on the use of a lime-magnesium content scrubbing liquor or other magnesium-containing scrubbing liquor which is regenerated through the use of lime. U.S. Pat. No. 3,919,393 and 3,919,394 to Joseph Selmeczi, both of which are incorporated by reference herein, and both of which are assigned to the assignee of the present invention, for example, use a lime slurry containing a specified amount of magnesium components which results in an increased removal of sulfur dioxide from a gaseous stream. In addition, U.S. Pat. No. 5,039,499, issued to Donald Stowe, Jr., which is incorporated by reference herein and which is assigned to the assignee of the present invention, describes a process where magnesium hydroxide is added to an aqueous scrubbing liquor to remove sulfur dioxide from a gaseous stream, with effluent from the scrubber oxidized and then treated with a magnesium-containing lime slurry to obtain regenerated magnesium hydroxide for recycle to the scrubbing unit.

In such processes where a magnesium component is used to remove sulfur dioxide from flue gases, through formation of magnesium sulfite and oxidation of the magnesium sulfite to magnesium sulfate, and lime used to regenerate magnesium hydroxide, calcium sulfate is present which is difficult to separate from the magnesium hydroxide so produced. U.S. Pat. No. 4,996,032 issued to Donald Stowe, Jr. and Lewis Benson, which is incorporated by reference herein and is assigned to the assignee of the present invention, discusses the problems of separating magnesium hydroxide from gypsum and teaches a process for forming a magnesium hydroxide product from an aqueous slurry resulting from a wet scrubbing process.

In systems where magnesium components are present in a wet scrubbing slurry for sulfur dioxide removal, with magnesium sulfite produced that is then oxidized to magnesium sulfate, and the sulfate contacted with lime to produce calcium sulfate as gypsum and magnesium hydroxide, the resultant magnesium hydroxide produced is contaminated with gypsum. The resultant magnesium hydroxide can be partially purified by physical separation, such as froth floatation, elutriation or hydrocloning but, in such cases, the magnesium hydroxide will still retain an amount of gypsum as a contaminant that limits the uses to which such magnesium hydroxide may be put. Generally, we have found that following such physical separation, the magnesium hydroxide separated portion can contain between about 20–45 percent contaminants, a major portion of which is calcium sulfate, or gypsum. In order to purify the magnesium hydroxide so separated, various purification processes may be used but such processes contain use of additional chemicals or expensive equipment and the production of various by-products or the like which must be discarded.

It is an object of the present invention to provide a process for removing sulfur dioxide from flue gases using an aqueous scrubbing medium containing magnesium components and collecting purified magnesium hydroxide and gypsum from the effluent discharged from a wet scrubbing unit used in the process.

SUMMARY OF THE INVENTION

A purified magnesium hydroxide product and gypsum are recovered from a sulfur dioxide wet scrubbing process using magnesium components, and lime in the scrubbing unit or elsewhere in the process. The sulfur dioxide is removed from flue gases by contact with an aqueous medium containing magnesium components to form magnesium sulfite. Water is lost from the scrubbing system at various locations. The magnesium sulfite is oxidized to magnesium sulfate, which is then contacted with lime to produce calcium sulfate and magnesium hydroxide. The magnesium hydroxide is physically separated from the calcium sulfate, with the calcium sulfate discharged from the system, which magnesium hydroxide will still be contaminated by calcium sulfate. Water is added to the contaminated separated magnesium hydroxide so as to dissolve residual calcium sulfate and form an aqueous solution, and the dissolved calcium sulfate is removed from the magnesium hydroxide to purify the magnesium hydroxide portion. The purified magnesium hydroxide is physically separated from the resultant aqueous solution of calcium sulfate to provide a purified saleable magnesium hydroxide product. In order to return lost water to the scrubbing system, at least a portion of the resultant aqueous solution of calcium sulfate, which is below the saturation point of an aqueous solution thereof, is returned to the wet scrubbing system as make-up water. The process thus provides a purified magnesium hydroxide product and make-up water to the wet scrubbing system.

BRIEF DESCRIPTION OF THE DRAWING

The present invention will become more readily apparent from the following description of a preferred embodiment thereof shown, by way of example only, in the accompanying drawing, wherein a flow diagram illustrates the presently preferred process of the present invention.

DETAILED DESCRIPTION

The present process provides for the removal of sulfur dioxide from flue gases using magnesium components in a wet scrubbing system, with the production of gypsum and a purified magnesium hydroxide product from the effluent discharged from the wet scrubbing systems.

In the present process, the aqueous scrubbing medium may be an aqueous lime slurry that contains an effective amount of magnesium ions to form magnesium sulfite by reaction with the sulfur dioxide in the gas, such as described in U.S. Pat. Nos. 3,919,393 and 3,919,394 referred to hereinbefore. Or, the scrubbing medium may be an aqueous suspension of magnesium hydroxide which forms magnesium sulfite by reaction with the sulfur dioxide in the gas, such as described in U.S. Pat. No. 4,996,032 or U.S. Pat. No. 5,039,499 also referred to hereinbefore. The aqueous scrubbing medium is recycled through a scrubbing unit through which the gas is passed, and a bleed stream of scrubbing medium removed therefrom which is treated to remove sulfites and sulfates formed during the reaction of the gas with the magnesium components of the scrubbing medium.

Referring now to the drawing, the present process is schematically illustrated, showing a wet scrubbing unit 1, with a gaseous stream containing sulfur dioxide fed thereto through line 3 and clean gas discharged through line 5. An aqueous scrubbing medium containing a magnesium component is charged to the wet scrubbing unit and such aqueous medium recycled therethrough by means of line 7, pump 9, and line 11 to the upper region of the scrubbing unit and discharged through nozzles 13 so as to flow downwardly, countercurrent to the upward flow of the gas, in the wet scrubbing unit 1. When lime containing a magnesium component is used as the aqueous scrubbing medium, the lime is passed through line 15 to a slaker 17 and mixed with water fed through line 19, and the slaked lime containing a magnesium component charged through line 21 to the wet scrubbing unit 1. Where magnesium hydroxide alone is fed to the wet scrubbing unit 1 for use as the aqueous scrubbing medium, the lime slaker 17 is not used but rather a supply of aqueous magnesium hydroxide is fed through line 23 to line 21 for charging to the wet scrubbing unit 1. During operation of the wet scrubbing unit 1, a bleed stream containing magnesium sulfite is removed from the wet scrubbing unit 1 through line 25 and fed to a separator, such as a thickener unit 27. In the thickener unit 27, an underflow, in the form of a thickened aqueous sludge which contains magnesium sulfite solids, is separated and discharged through line 29 as an underflow portion, while the clarified or overflow portion containing dissolved magnesium sulfite is fed through line 31 to a thickener overflow surge tank 33, and thickener overflow, as desired, returned to the scrubbing unit 1 through recycle line 35. The thickener sludge or underflow from thickener 27 is passed through line 29 to an oxidizer 37 and an oxygen-containing gas, such as air, from line 39, charged thereto to oxidize magnesium sulfite to magnesium sulfate and form an aqueous solution that is passed through line 41, by means of a pump 43, to a regeneration tank 45. Lime, through line 47, and water, through line 49, are mixed in a slaker 51 and then slaked lime produced fed through line 53 to the regeneration tank 45, which lime precipitates calcium sulfate or gypsum from the magnesium sulfate solution while simultaneously forming an aqueous magnesium hydroxide suspension. The aqueous media, now containing calcium sulfate solids and suspended magnesium hydroxide is passed through line 55, by means of pump 57, to a separator 59, such as a hydrocyclone, which physically separates the calcium sulfate, or gypsum, solids from the magnesium hydroxide suspension. The separated portion containing calcium sulfate is collected in a tank 61, from which it is charged through line 63, containing pump 65, to a filter 67. Filtered solid calcium sulfate or gypsum is collected at line 69, while the filtrate is discharged through line 71.

The magnesium hydroxide suspension, separated from the calcium sulfate solids in separator 59 is removed therefrom through line 73. This magnesium hydroxide suspension, however, will still be contaminated with calcium sulfate and must be further purified in order to be in best condition for use as a saleable commodity. In order to further purify the magnesium hydroxide, the suspension from line 73 is charged to a dissolution tank 75 to which fresh water is also charged through line 77. In the dissolution tank 75, because of the relative solubility of calcium sulfate in water as compared with the solubility of magnesium hydroxide in water, calcium sulfate solids will preferentially be dissolved in the fresh water added and a higher purity magnesium hydroxide solids content will result. The solubility of magnesium hydroxide in water is about 9 ppm by weight, while the solubility of calcium sulfate, as gypsum, is between about 210 to 4100 ppm by weight depending upon the temperature of the water and chloride concentration of the aqueous medium. In the present process, the amount of fresh water that is charged to the dissolution tank 75 is that sufficient to dissolve a major amount of the calcium sulfate contaminant in the magnesium hydroxide and produce an aqueous solution of calcium sulfate that is below the saturation point. The contents of the dissolution tank 75 are then fed through line 79 to a separator 81. In the separator 81, the suspended magnesium hydroxide solids will form a lower layer 83, while an aqueous calcium sulfate solution will form an upper supernatant phase 85 and separation effected The purified magnesium hydroxide suspension is discharged from the separator 81 through line 87 and filtered in a filter 89, with the filtered magnesium hydroxide solids recovered at 91, and purification filtrate removed through line 93.

The supernatant aqueous solution of calcium sulfate is removed from the separator 81 through line 95 and is returned to the scrubbing system as make up water in the scrubbing process. For example, the aqueous solution of calcium sulfate may be passed through valve 97 back to the wet scrubbing unit 1 through line 99, or passed through valve 97 back to the thickener overflow surge tank 33 through line 101, valve 103 and line 105. The return of the portion of aqueous solution of calcium sulfite to the thickener overflow tank, which is returned to the scrubber, or to the wet scrubbing unit directly results in dissolution in the aqueous scrubbing medium and replenishes alkalinity in the wet scrubbing unit. Alternatively, the aqueous solution of calcium sulfate may be passed by valve 103, through line 107 to be used as slaking water in the slaker 51 used to slake lime for use in the regeneration tank 45. In the case where lime, containing magnesium hydroxide, is used as the scrubbing medium in the wet scrubber 1, aqueous solution of calcium sulfate may be diverted through valve 109, and through line 111, to be used as slaking water in the slaker 17. An advantage of returning aqueous calcium sulfate to the lime slaker as a portion of slaking water, as described in U.S. Pat. No. 5,082,639, assigned to the assignee of the present invention, is in providing a more easily dewatered sludge that is removed from the scrubbing system, through increase in the particle size of calcium components of the sludge. Additional make-up water for the scrubbing system may be provided by diverting purification filtrate from the filter 89, for magnesium hydroxide, from line 93 through line 113 to line 95, or by diverting filtrate from the filter 67, for gypsum, from line 71 through line 115 to line 95.

The return of at least a portion of the resultant aqueous solution from separation of purified magnesium hydroxide to the wet scrubbing system to serve as make-up water to replenish water lost from the aqueous scrubbing medium is an important factor in the process. In wet scrubbing systems, the major loss of water from the aqueous scrubbing medium occurs in the wet scrubbing unit 1, where the hot sulfur-dioxide containing gases cause evaporation of such water and, although demisting devices are provided to remove water droplets from the gases prior to discharge from the scrubbing unit, as a general rule, about one gallon per minute of water is lost per megawatt energy produced in a power plant with the discharge of clean gases 5 from the wet scrubbing unit 1. For example, in a 500 megawatt power plant, about 500 gallons per minute of water is lost through the wet scrubbing unit by evaporation. In addition, with the removal of a bleed stream from such a system, where gypsum is produced and removal from the system, the gypsum cake (69) upon filtering will retain about 30 percent water, which will result in a loss of about 60 gallons per minute of water from the system for a 500 megawatt power plant.

EXAMPLE

A flue gas stream containing sulfur dioxide was contacted in a wet scrubbing unit with a magnesium hydroxide aqueous medium according to the process described in U.S. Pat. No. 5,039,499, with oxidation of a bleed stream effected, followed by regeneration by addition of lime to the oxidized bleed stream to produce an aqueous medium containing calcium sulfate solids and a magnesium hydroxide suspension. To 4 liters (40 gr solids) of the magnesium hydroxide suspension, as a hydroclone overflow (73), which was contaminated with calcium sulfate, there was added water, and after mixing the mixture was allowed to settle, and a magnesium hydroxide purified product separated from the resultant aqueous solution of calcium sulfate. In Test #1, excess water (16.5 liters) was added, in Test #2, an estimated minimum amount of water (3.2 liters) was added, and in Test #3, a slight excess amount of water (5.0 liters) was added.

The purification of the magnesium hydroxide removed is shown in Table I for the three tests:

TABLE I

| Solids Composition | Test #1 (wt. %) | Test #2 (wt. %) | Test #3 (wt. %) |
|---|---|---|---|
| Initial | | | |
| Mg(OH)$_2$.5H$_2$O | 76.07 | 51.61 | 51.61 |
| Ca(SO$_4$).2H$_2$O | 20.21 | 23.56 | 23.56 |
| Ca(OH)$_2$ | 2.74 | 1.42 | 1.42 |
| Inerts (SiO$_2$) | 0.98 | 11.35 | 11.35 |
| Final | | | |
| Mg(OH)$_2$.5H$_2$O | 93.87 | 61.71 | 60.57 |
| CaSO$_4$.2H$_2$O | 2.20 | 8.26 | 7.56 |
| Ca(OH)$_2$ | 1.85 | 1.46 | 0.62 |
| Inerts (SiO$_2$) | 0.99 | 13.94 | 14.06 |
| Final Solids Calculated on a Calcined Basis | | | |
| MgO | 92.81 | 61.96 | 62.88 |
| CaO | 3.50 | 6.93 | 5.37 |
| STOT as SO$_4$ | 2.04 | 7.67 | 7.30 |
| Inerts (SiO$_2$) | 1.64 | 23.44 | 24.44 |

The present process thus provides an improved sulfur-dioxide removal, with a purified magnesium hydroxide produced, and with replenishment of water lost in the scrubbing system by water used in so purifying the magnesium hydroxide.

What is claimed is:

1. In a process for removing sulfur dioxide from flue gases where an aqueous scrubbing medium containing magnesium components is contacted with the flue gas in a wet scrubbing unit of a wet scrubbing system to remove sulfur dioxide therefrom by formation of magnesium sulfite, and said magnesium sulfite is oxidized to magnesium sulfate, with the magnesium sulfate contacted with lime to produce calcium sulfate and magnesium hydroxide, and wherein water is lost from said aqueous scrubbing medium, the improvement comprising:
   separating said magnesium hydroxide from said calcium sulfate, which magnesium hydroxide will be contaminated with calcium sulfate;
   adding water to the resultant contaminated separated magnesium hydroxide to dissolve residual calcium sulfate and form an aqueous solution thereof and purify said magnesium hydroxide;
   allowing said purified magnesium hydroxide solids to form a layer and said aqueous calcium sulfate solution to form an upper supernatant phase in a separator; separating purified magnesium hydroxide from said resultant supernatant phase aqueous solution of calcium sulfate; and
   returning at least a portion of said resultant aqueous solution of calcium sulfate to said wet scrubbing system as make-up water to replenish said water lost from said aqueous medium.

2. The process for removing sulfur dioxide from flue gases as defined in claim 1, wherein said wet scrubbing system includes a thickener overflow unit for separation of magnesium sulfite from said aqueous scrubbing medium and said portion of said resultant aqueous solution of calcium sulfate is returned to said thickener overflow unit.

3. The process for removing sulfur dioxide from flue gases as defined in claim 1, wherein said aqueous scrubbing medium contains lime and said portion of said resultant aqueous solution of calcium sulfate is returned to a slaking device for slaking of lime to be used in said aqueous scrubbing medium.

4. The process for removing sulfur dioxide from flue gases as defined in claim 1, wherein said portion of said resultant aqueous solution of calcium sulfate is returned to said wet scrubbing unit.

5. The process for removing sulfur dioxide from flue gases a defined in claim 1 wherein said portion of said resultant aqueous solution of calcium sulfate is returned for use as slaking water to slake lime for contact with said magnesium sulfate to produce calcium sulfate and magnesium hydroxide.

6. The process for removing sulfur dioxide from flue gases as defined in claim 1 wherein said aqueous scrubbing medium comprises a lime slurry that contains an effective amount of magnesium ions to form magnesium sulfite by reaction with the sulfur dioxide in the gas.

7. The process for removing sulfur dioxide from flue gases as defined in claim 1 wherein said aqueous scrubbing medium comprises an aqueous suspension of magnesium hydroxide which forms magnesium sulfite by reaction with the sulfur dioxide in the gas.

8. The process for removing sulfur dioxide from flue gases as defined in claim 1 wherein, after contact of magnesium sulfate with lime to produce calcium sulfate and magnesium hydroxide and separation of said magnesium hydroxide from said calcium sulfate, said calcium sulfate is filtered to produce a filtrate and at least a portion of said filtrate so produced is returned to said scrubbing system and used as additional make-up water.

9. The process for removing sulfur dioxide from flue gases as defined in claim 1 wherein said purified magnesium hydroxide, after separation from said aqueous calcium sulfate solution, is filtered to produce a purification filtrate and at least a portion of said purification filtrate so produced is returned to said scrubbing system and used as additional make-up water.

* * * * *